United States Patent [19]
Kawaguchi et al.

[11] Patent Number: 5,602,561
[45] Date of Patent: Feb. 11, 1997

[54] COLUMN ELECTRODE DRIVING CIRCUIT FOR A DISPLAY APPARATUS

[75] Inventors: Takafumi Kawaguchi; Shiro Takeda, both of Tenri; Hiroshi Take, Ikoma; Junji Kawanishi, Nara, all of Japan

[73] Assignee: Sharp Kabushiki Kaisha, Osaka, Japan

[21] Appl. No.: 148,408

[22] Filed: Nov. 8, 1993

Related U.S. Application Data

[63] Continuation of Ser. No. 714,706, Jun. 13, 1991, abandoned.

[30] Foreign Application Priority Data

Jun. 14, 1990 [JP] Japan ..................... 2-156263

[51] Int. Cl.⁶ ..................................... G09G 3/36
[52] U.S. Cl. ................. 345/99; 345/89; 345/100
[58] Field of Search ................. 345/98, 100, 94, 345/95, 96, 99, 103, 87, 89; 348/448, 790, 791, 792, 793

[56] References Cited

U.S. PATENT DOCUMENTS

| | | | |
|---|---|---|---|
| 4,447,812 | 5/1984 | Soneda et al. | 340/784 |
| 4,496,977 | 1/1985 | Ikeda | 358/148 |
| 4,795,239 | 1/1989 | Yamashita et al. | 340/784 |
| 4,842,371 | 6/1989 | Yasuda et al. | 340/784 |
| 4,931,787 | 6/1990 | Shannon | 340/784 |
| 5,041,823 | 8/1991 | Johnson | 340/784 |
| 5,103,218 | 4/1992 | Takeda | 340/784 |

FOREIGN PATENT DOCUMENTS

| | | |
|---|---|---|
| 2083584 | 3/1990 | European Pat. Off. . |
| 0373897 | 6/1990 | European Pat. Off. . |

*Primary Examiner*—Steven Saras

[57] ABSTRACT

The column electrode driving circuit is suitable for driving a display apparatus which has a delta arrangement display unit. The video signals for two rows in the display unit are sampled simultaneously by two sample-hold circuits with sampling timings which differ mutually by one-half of the sampling period. The outputs of the two sample-hold circuits are alternatingly supplied to column electrodes of the display unit.

13 Claims, 11 Drawing Sheets

COLUMN ELECTRODE DRIVING CIRCUIT FOR A DISPLAY APPARATUS

This application is a continuation of application Ser. No. 07/714,706 filed on Jun. 13, 1991, now abandoned.

BACKGROUND OF THE INVENTION

1. Field of the Invention

This invention relates to a column electrode driving circuit for a display apparatus, and more particularly it relates to a column electrode driving circuit for a matrix type display apparatus such as a liquid crystal display (LCD) apparatus.

2. Description of the Prior Art

An LCD apparatus is shown in FIG. 11 as a typical example of a matrix type display apparatus.

The LCD apparatus of FIG. 11 comprises a liquid crystal panel 110 in which pixel electrodes 113 are arranged in a matrix, a row electrode driving circuit 115, a column electrode driving circuit 116, and a control column 117. The liquid crystal panel 110 comprises two opposing substrates, one of which has a plurality of row electrodes 111 and a plurality of column electrodes 112 intersecting the row electrodes 111. At each of the intersections of the row electrodes 111 and column electrodes 112, a transistor 114 is provided for applying a video signal to one of the pixel electrodes 113 through the corresponding column electrode 112. Namely, a plurality of the pixel electrodes 113 constituting one column are connected to one column electrode 112.

The row electrode driving circuit 115 sequentially supplies scanning pulses to the row electrodes 111, and the column electrode diving circuit 116 supplies a video signal which is a voltage signal to be applied to the pixel electrodes 113, to the column videos 112. When the row video driving circuit 115 supplies a scanning pulse to a certain row electrode 111, the transistors 114 the gate of which is connected to that row electrode 111 are turned ON, and video signals on the column electrodes 112 are transmitted to the pixel electrodes 113 connected to the transistors 114 in ON state. The operation of the row electrode driving circuit 115 and column electrode driving circuit 116 is controlled by the control circuit 117.

A matrix type LCD apparatus such as that shown in FIG. 11 in which very pixel is provided with a transistor 114 is capable of displaying images in high contrast by means of the switching function of the transistors 114 even in cases in which multiplex drive of a plurality of row electrodes 111 is performed, and therefore it is widely used as a display unit in a portable electronic apparatus and many other electronic apparatus.

FIG. 12 shows the configuration of the column electrode driving circuit 116. The column electrode driving circuit 116 simultaneously processes video signals for two rows of the pixel electrodes 113 (i.e., two rows of pixels), and comprises a shift register 121, two sample-hold circuits 122A and 122B, and two output buffer circuits 123A and 123B.

In the shift register 121, a sampling signal S input from an external unit is shifted in accordance with a clock signal $\phi$ so that sampling signals $q_1, q_2, \ldots, q_n$ are sequentially output. The sample-hold circuit 122A samples and holds the voltage component of a video signal $V_A$ non the basis of the sampling signals $q_1$ to $q_n$, and outputs voltage signals $QA_1$ to $QA_n$. The other sample-hold circuit 122B samples and holds the voltage component of a video signal $V_B$ on the basis of the sampling signals $q_1$ and $q_n$, and outputs voltage signals $QB_1$ to $QB_n$. Each of the voltage signals $QA_1$ to $QA_n$ and $QB_1$ to $QB_n$ has a level which is substantially equal to the respective voltage level held in the circuits 122A and 122B. The output buffer circuit 123A takes in the voltage signals $QA_1$ to $QN_n$ according to an output pulse T, and outputs them in parallel to the column electrodes 112 during the period the level of a selection signal U is positive. In contrast, the output buffer circuit 123B takes in the voltage signals $QB_1$ to $QB_n$ according to the output pulse T, and outputs them in parallel to the column electrodes 112 during the period the level of the selection signal U is negative.

The operation of the column electrode driving circuit 116 will be described with reference to FIG. 13. The video signals $V_A$ and $V_B$ are both input serially. In the ith sampling period, at the timing the sampling signals $q_1, \ldots, q_j, \ldots, q_n$ are output from the shift register 121, the voltage components $V_{Ai,1}, \ldots, V_{Ai,j}, \ldots, V_{Ai,n}$ of the video signal $V_A$ are sampled and held by the sample-hold circuit 122A. In the same sampling period, the voltage components $V_{Bi,1}, \ldots, V_{Bi,j}, \ldots, V_{Bi,n}$ of the video signal $V_B$ are sampled and held by the sample-hold circuit 122B. The sample-hold circuit 122A outputs the voltage signals $QA_j$ (j=1 to n) based on the held voltage $V_{Ai,j}$ (j=1 to n), and these voltage signals are output from the output buffer circuit 123A as the voltage signal $Q_j$ during the period the selection signal U in the first half of the next (i+1)th sampling period is positive. The sample-hold circuit 122B outputs the voltage signals $QB_j$ (j=1 to n) based on the held voltage $V_{Bi,j}$ (j=1 to n), and these voltage signals are output from the output buffer circuit 123B as the voltage signal $Q_j$ during the period the selection signal U in the last half of the (i+1)th sampling period is negative.

In the column electrode driving circuit 116, the video signals for two rows of the pixel electrodes 113 are sampled simultaneously. Therefore, by supplying a video signal belonging to odd fields to the column electrode driving circuit 116 as the video signal $V_A$ and supplying a video signal belonging to even fields to the column electrode driving circuit 116 as the video signal $V_B$, a display system which receives a video signal for the non-interlace scanning and uses a field memory to perform the double-speed non-interlaced display can be easily realized without increasing the frequency of the video signal.

FIG. 14 shows another LCD apparatus having a liquid crystal panel 140 in which the pixel electrodes 113 are formed into a so-called delta arrangement. More specifically, the positions of the pixel electrodes 113 in one row are shifted along the row direction by one-half pixel from those of the pixel electrodes in the adjacent rows. In displaying images based on a television signal, the LCD apparatus of FIG. 14 having pixel electrodes with a delta arrangement is superior in display quality to the LCD apparatus of FIG. 12 with a conventional arrangement of the pixel electrodes, provided that the numbers of the pixel electrodes in both the apparatus are equal to each other.

However, in the column electrode driving circuit 116 described above, the two sample-hold circuits 122A and 122B sample a video signal with the same sampling timing, and therefore a condition in which the sampling timing of a video signal does not conform with the position of the pixel electrode corresponding to the sampled video signal occurs every other row of the pixel electrodes 113. This causes the degradation of the display quality. For this reason, the column electrode driving circuit 116 is not suitable for driving a delta-arrangement display unit such as the panel 140.

A device for driving a delta-arrangement display unit and having double-speed conversion means is disclosed in the copending U.S. patent application Ser. No. 07/659,211 filed Feb. 22, 1991 which is now U.S. Pat. No. 5,922,658.

SUMMARY OF THE INVENTION

The column electrode driving circuit of this invention, which overcomes the above-discussed and numerous other disadvantages and deficiencies of the prior art, comprises: a plurality of sample-hold means for receiving a video signal, for sampling said video signal, and for holding said sampled video signal, the sampling periods of said sample-hold means being substantially the same with each other, the sampling timings of said sample-hold means being different from each other; and output means for selecting one of said sample-hold means, and for driving said column electrodes on the basis of the sampled video signal held in said selected sample-hold means.

In preferred embodiments, the number of said sample-hold means is two.

In preferred embodiments, the sampling timings of said two sample-hold means are different from each other by one-half of said sampling period.

In preferred embodiments, said driving circuit further comprises sample signal generating means for sequentially generating sample signals, the number of said sample signals being twice the number of said column electrodes.

In preferred embodiments, one of said two sample-hold means receives the odd ones of said sample signals, and the other of said two sample-hold means receives the even ones of said sample signals, said two sample-hold means performing the sampling in accordance with said received sample signals, respectively.

Preferably, said driving circuit further comprises first and second sample signal generating means for sequentially generating sample signal, the number of said sample signals being equal to the number of said column electrodes.

Preferably, one of said two sample-hold means receives sample signals from said first sample signal generating means, and the other of said two sample-hold means receives sample signals from said second sample signal generating means.

Preferably, said driving circuit further comprises selection means coupled to the output of said sample signal generating means, and for selectively outputting either of said odd and even ones of said sample signals.

Thus, the invention described herein makes possible the objectives:

(1) providing a column electrode driving circuit which can drive a display apparatus with an excellent display quality;

(2) providing a column electrode driving circuit which can drive a display apparatus having a delta arrangement display unit, with an excellent display quality;

(3) providing a column electrode driving circuit which can simultaneously drive two rows of pixels in a display apparatus, without requiring the double-speed conversion; and (4) providing a column electrode driving circuit which can simultaneously drive two rows of pixels in a display apparatus, without requiring an external field memory.

BRIEF DESCRIPTION OF THE DRAWINGS

This invention may be better understood and its numerous objects and advantages will become apparent to those skilled in the art by reference to the eh accompanying drawings as follows.

DESCRIPTION OF THE PREFERRED EMBODIMENTS

Figure 1:
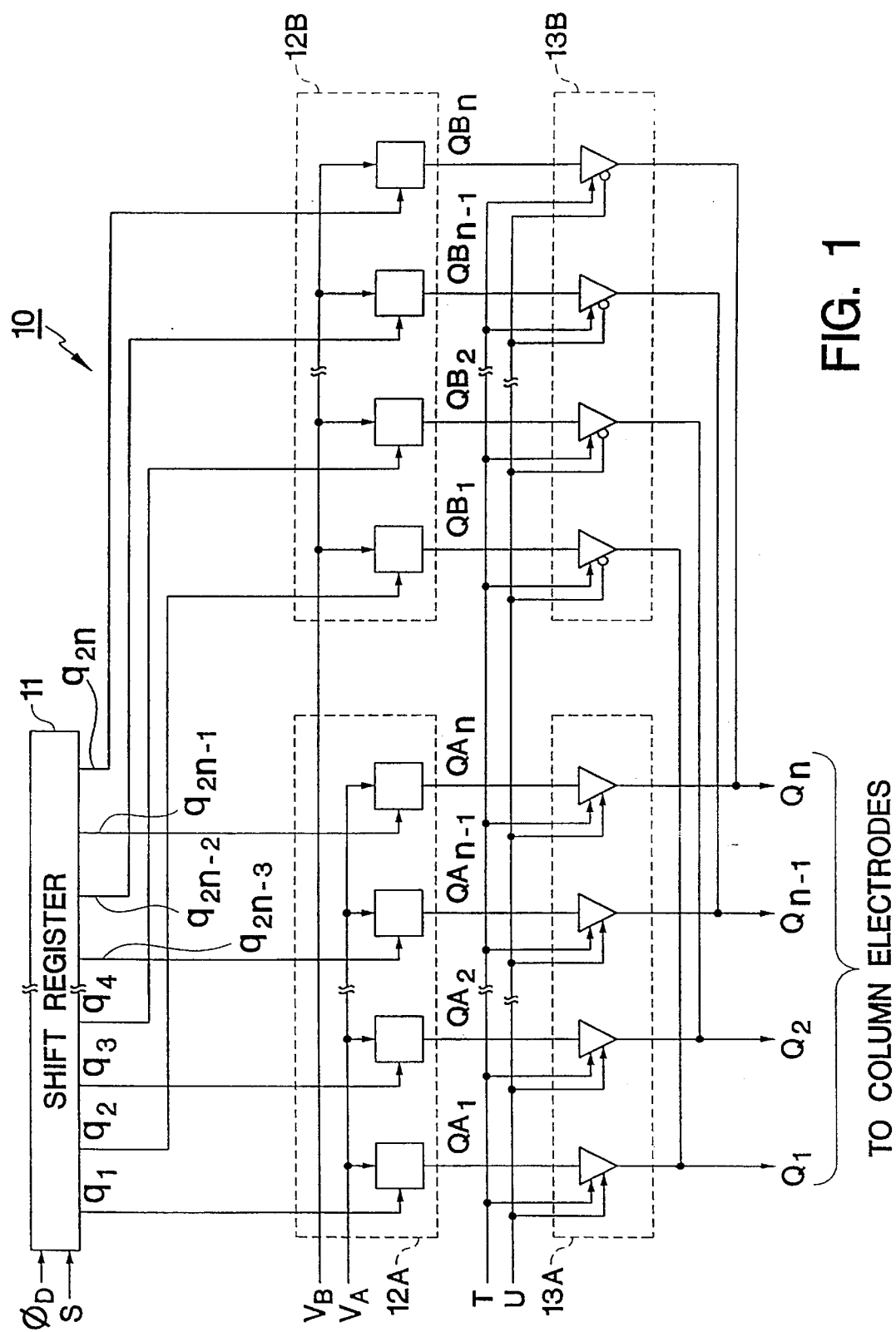
FIG. 1 is a circuit diagram illustrating a first embodiment of the invention.
Figure 14:
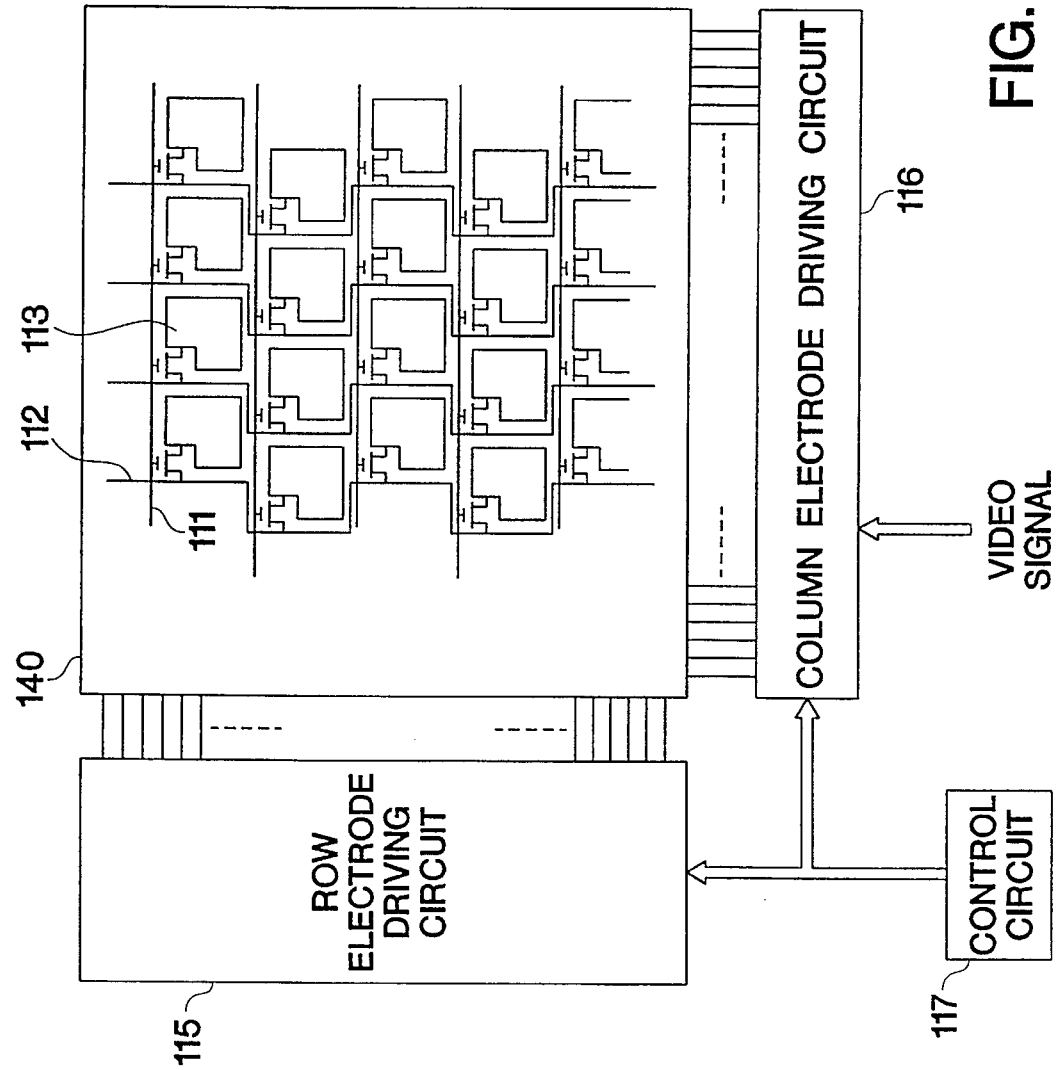
FIG. 14 diagrammatically illustrates a conventional LCD apparatus with a delta-arrangement.

FIG. 1 shows a column electrode driving circuit according to the invention. The column electrode driving circuit 10 shown in FIG. 1 drives the liquid crystal panel 140 (FIG. 14) with a delta arrangement, and comprises a shift register 11, two sample-hold circuits 12A and 12B, and two output buffer circuits 13A and 13B.

Figure 12:
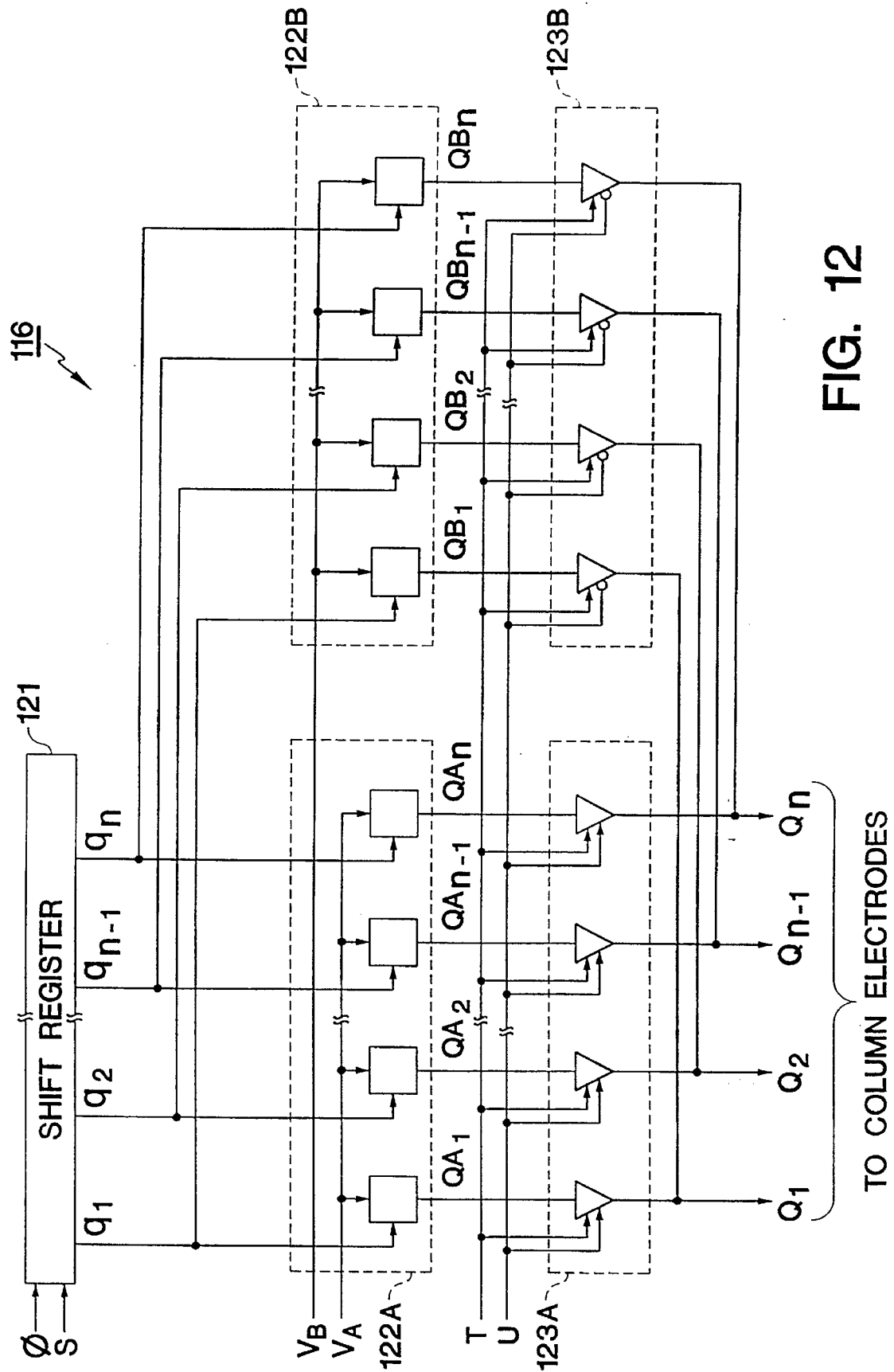
FIG. 12 is a circuit diagram illustrating a column electrode driving circuit used in the LCD apparatus of FIG 11.
Figure 13:
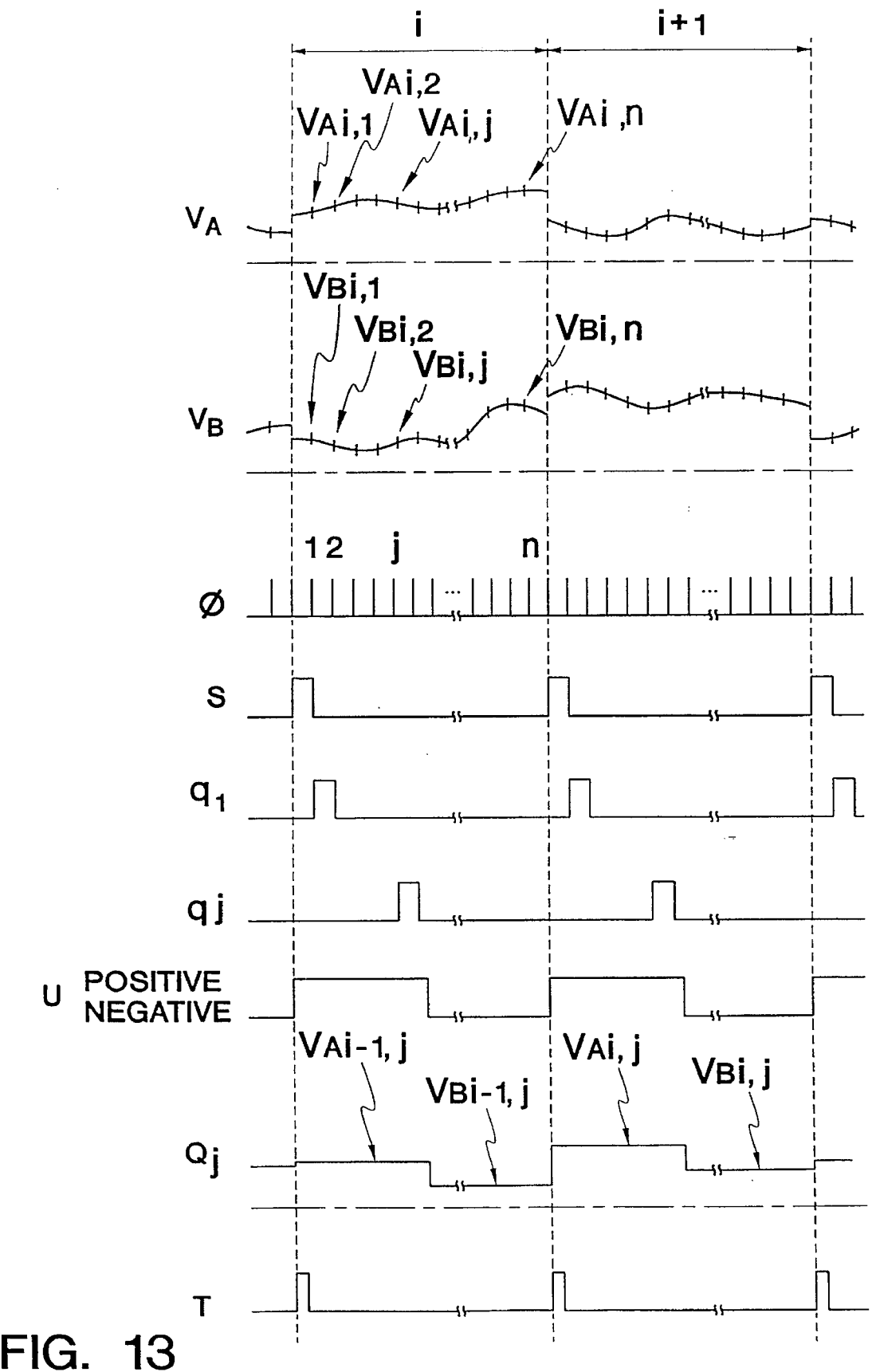
FIG. 13 is a timing chart illustrating the operation of the circuit of FIG. 12.

The number of the stages (2n stages) of the shift register 11 is twice as that (n stages) of the shift register 121 shown in FIG. 12, i.e., twice as the number of column electrodes 112 of the liquid crystal panel 140. The shift register 11 shifts a sampling signal S in accordance with a clock signal $\phi_D$ having a frequency twice that of the clock $\phi$ for the shift register 121, and sequentially outputs sampling signals $q_1$, $q_2$, ..., $q_{2n}$. The sample-hold circuits 12A and 12B have the same configuration as the sample-hold circuits 122A and 122B, but the sample-hold circuit 12A samples and holds the voltage component of the video signal $V_A$ in accordance with the odd sampling signals $q_1, q_3, ..., q_{2n-1}$ output from the shift register 11, while the sample-hold circuit 12B samples and holds the voltage component of the video signal $V_B$ for the rows adjacent to the rows corresponding to the video signal $V_A$ in accordance with the even sampling signals $q_2, q_4, ..., q_{2n}$ output from the shift register 11.

The output buffer circuit 13A simultaneously takes in the voltage signals $QA_1$ to $QA_n$ which are substantially equal to the voltage held by the sample-hold circuit 12A, in accordance with the output pulse T, and outputs them in parallel to the column electrodes 112 during the period the level of the selection signal U is positive. In contrast, the output buffer 13B simultaneously takes in the voltage signals $QB_1$ to $QB_n$ which are substantially equal to the voltage held by the sample-hold circuit 12B, in accordance with the output pulse T, and outputs them in parallel to the column electrodes 112 during the period the level of the selection signal U is negative.

Figure 2:
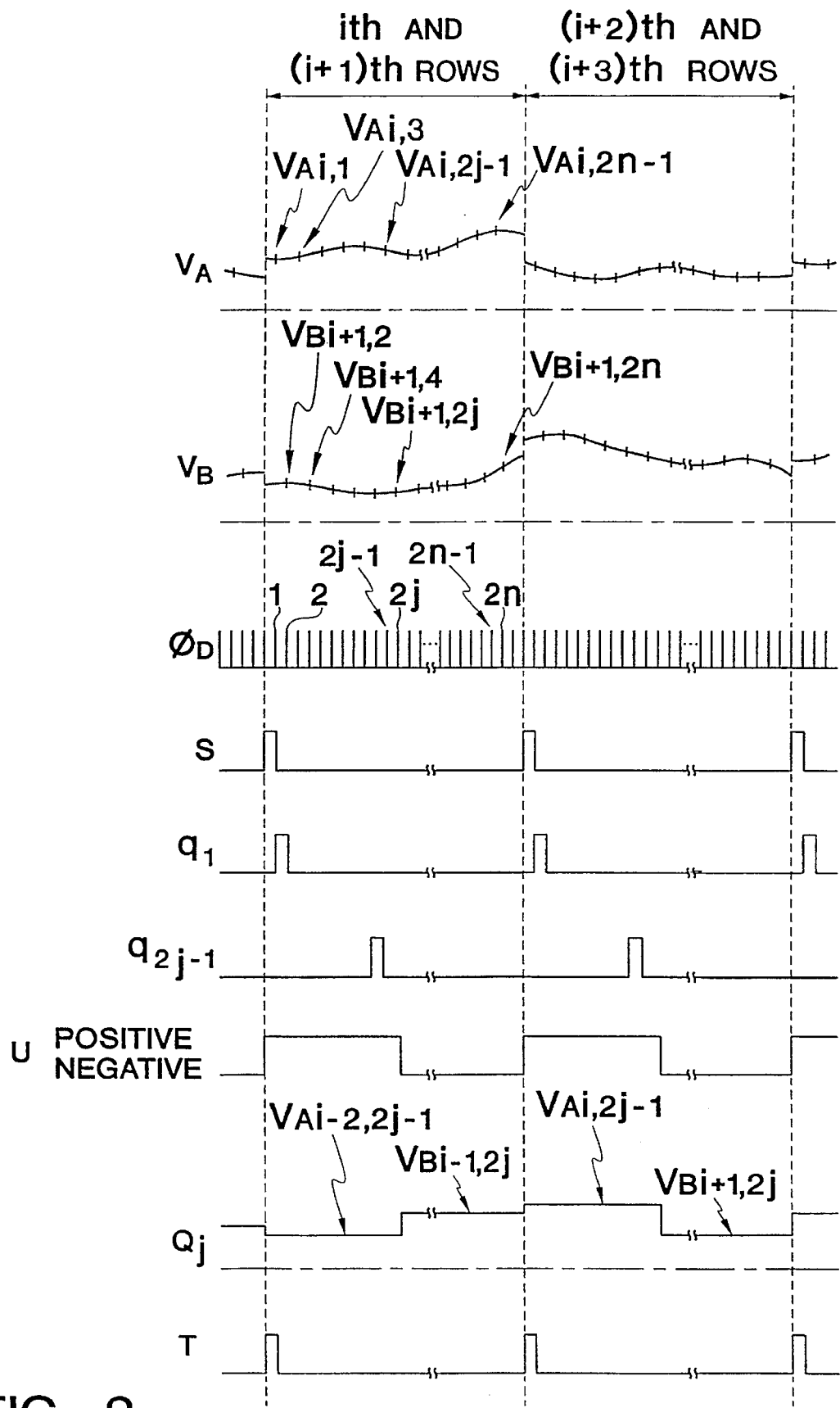
FIG. 2 is a timing chart illustrating the operation of the embodiment of FIG. 1.

The operation of the column electrode driving circuit 10 will be described in more detail with reference to FIG. 2. Both video signals $V_A$ and $V_B$ are input serially. The sample-hold circuit 12A samples the voltage components $V_{Ai,1}, \ldots, V_{Ai,2j-1}, \ldots, V_{Ai,2n-1}$ (corresponding to the ith row of the pixel electrodes 113) of the video signal $V_A$ at the timings the odd sampling signals $q_1, \ldots, q_{2j-1}, \ldots, q_{2n-1}$ are output from the shift register 11. The sample-hold circuit 12B samples the voltage components $V_{Bi+1,2}, \ldots, V_{Bi+1,2j}, \ldots, V_{Bi+1,2n}$ (corresponding to the (i+1)th row of the pixel electrodes 113) of the video signal $V_B$ at the timings the even sampling signals are output from the shift register 11. The sample-hold circuit 12A generates voltage signals $QA_j$ (j=1 to n) based on the held voltages $V_{Ai,2j-1}$ (j=1 to n). The voltage signals $QA_j$ are output from the output buffer circuit 13A as voltage signals $Q_j$ during the selection signal U in the first half of the next sampling period (for the (i+2)th and (i+3)th rows) is positive. The sample-hold circuit 12B generates voltage signals $QB_j$ (j=1 to n) based on the held voltages $V_{Bi+1,2j}$ (j=1 to n), and the voltage signals $QB_j$ are output from the output buffer circuit 13B as the voltage signals $Q_j$ during the selection signal U in the last half of the next sampling period is negative.

Both the sampling period of the sample-hold circuit 12A and that of the sample-hold circuit 12B are one-half of the period of the clock signal $\phi_D$. However, the sampling timing of the sample-hold circuit 12B is delayed behind that of the sample-hold circuit 12A by one-half of the above sampling period. According to this embodiment, therefore, the sampling of a video signal is performed in conformity with a delta-arrangement, and therefore the liquid crystal panel 140 with a delta arrangement can be driven with an excellent image quality. Furthermore, video signals for two rows of pixel electrodes 113 are sampled simultaneously in one sampling period, and the thus sampled video signals are then used to drive the column electrodes 112 in the time division manner in the next sampling period. Therefore, the display quality equivalent to that of the double-speed conversion display can be achieved without using an external double-speed converter for a video signal.

Figure 3:
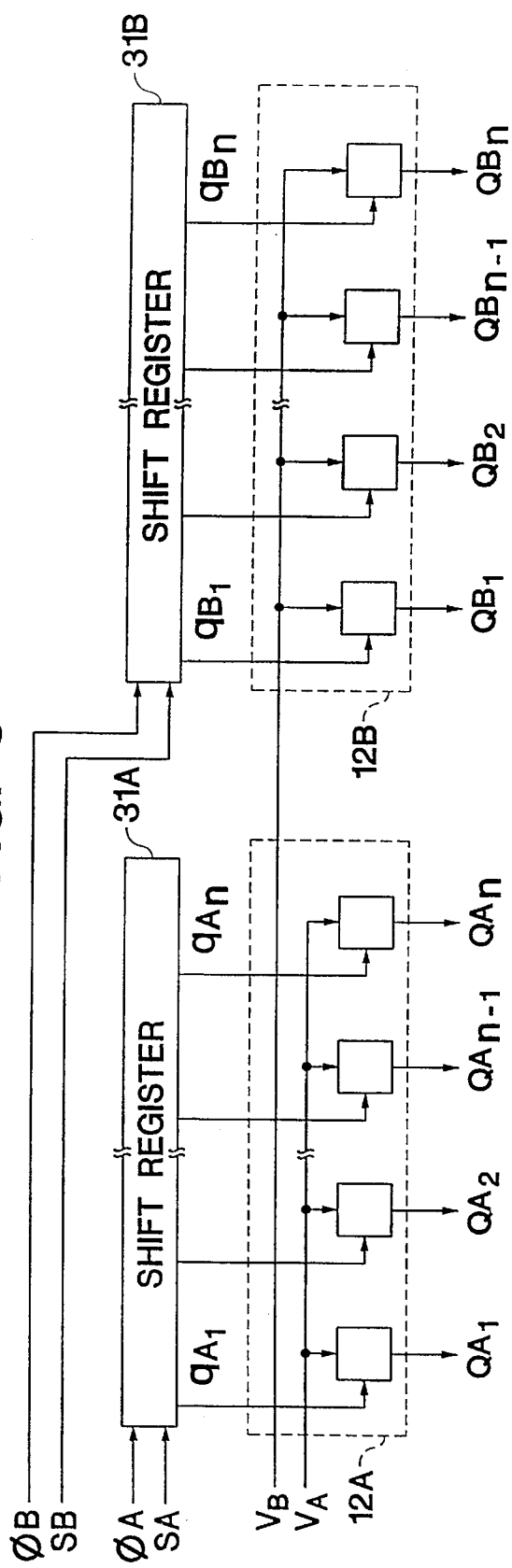
FIG. 3 is a circuit diagram illustrating a second embodiment of the invention.
Figure 4:
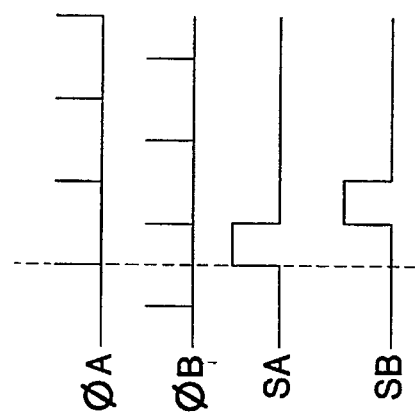
FIG. 4 is a timing chart illustrating signals input to the embodiment of FIG. 3.

FIG. 3 shows the principal components of a second embodiment of the invention. In place of the shift register 11 shown in FIG. 1, this embodiment is provided with two shift registers 31A and 31B. The number (n) of stages of each of the shift registers 31A and 31B is equal to the number (n) of column electrodes 112 of the liquid crystal panel 140. The shift register 31A receives a first clock signal $\phi_A$, and a first sampling signal $S_A$, and the shift register 31B receives a second clock signal $\phi_B$, and a second sampling signal $S_B$. The first and second clock signals $\phi_A$ and $\phi_B$ have the same frequency, but the phase of the clock signal $\phi_B$ is shifted from that of the clock signal $\phi_A$ by one-half of the clock period as shown in FIG. 4. The second sampling signal $S_B$ is delayed by one pulse width from the first sampling signal $S_A$. The shift register 31A shifts the sampling signal $S_A$ in accordance with the clock signal $\phi_A$, and sequentially outputs the sampling signals $qA_1$ to $qA_n$ to the sample-hold circuit 12A. The shift register 31B shifts the sampling signal $S_B$ according to the clock signal $\phi_B$ which has the same period as the clock signal $\phi_A$, and sequentially outputs the sampling signals $qB_1$ to $qB_n$ to the sample-hold circuit 12B. As described above, the phase of the clock signal $\phi_B$ differs from that of the clock signal $\phi_A$ by one-half of the clock period, and hence the sampling timing of the sample-hold circuit 12B differs from that of the sample-hold circuit 12A by one-half of the sampling period (equal to the clock period). Therefore, this embodiment can achieve the same results as the column electrode driving circuit 10 of FIG. 1.

Figure 5:
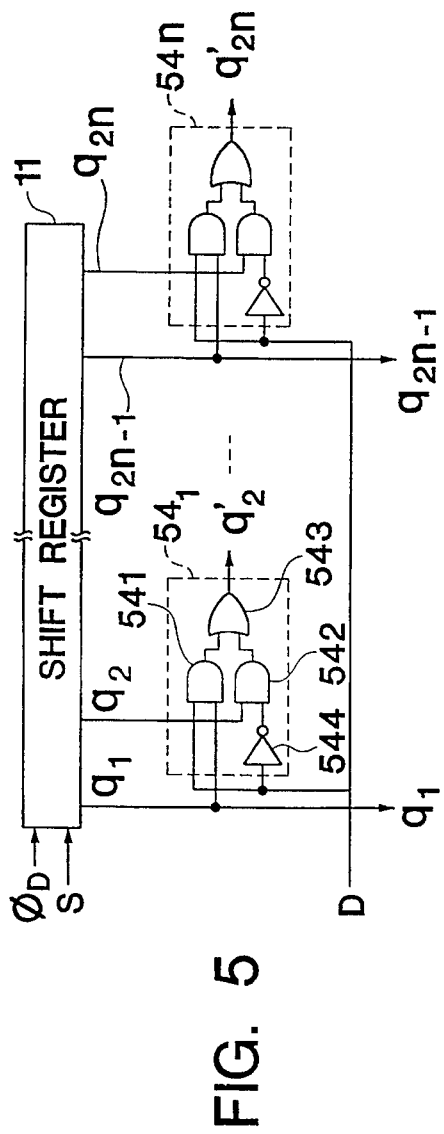
FIGS. 5–7 illustrate the principal portions of third to fifth embodiments of the invention, respectively.

FIG. 5 shows the principal components of a third embodiment of the invention. In this embodiment, function switching circuits $54_1$ to $54_n$ are provided at the output of the shift register 11, whereby the same operation as that of the column electrode driving circuit 116 (FIG. 12) can be achieved. The function switching circuits $54_1$ to $54_n$ are respectively provided for each combination of two sampling signals $q_{2j-1}$ and $q_{2j}$ (j=1 to n) of the sampling signals output from the shift register 11. Each of the function switching circuits $54_1$ to $54_n$ receives two sampling signals $q_{2j-1}$ and $q_{2j}$, and a function switching signal D, and comprises two AND gates 541 and 542, an OR gate 543, and an inverter 544. The function switching circuits $54_1$ to $54_n$ generate sampling signals $q_2'$ to $q_{2n}'$ which are supplied to the sample-hold circuit 12B (FIG. 1), respectively. For example, the sampling signal $q_2'$ which is generated by the first function switching circuit $54_1$ corresponding to the sampling signals $q_1$ and $q_2$ is equivalent to the sampling signal $q_1$ when the function switching signal D is HIGH, and is equivalent to the sampling signal $q_2$ when the function switching signal D is LOW. In other words, when the function switching signal is HIGH, this embodiment functions in the same manner as the column electrode driving circuit 116 (FIG. 12), and when the function switching signal D is LOW, this embodiment functions in the same manner as the column electrode driving circuit 10 of FIG. 1.

Figure 6:
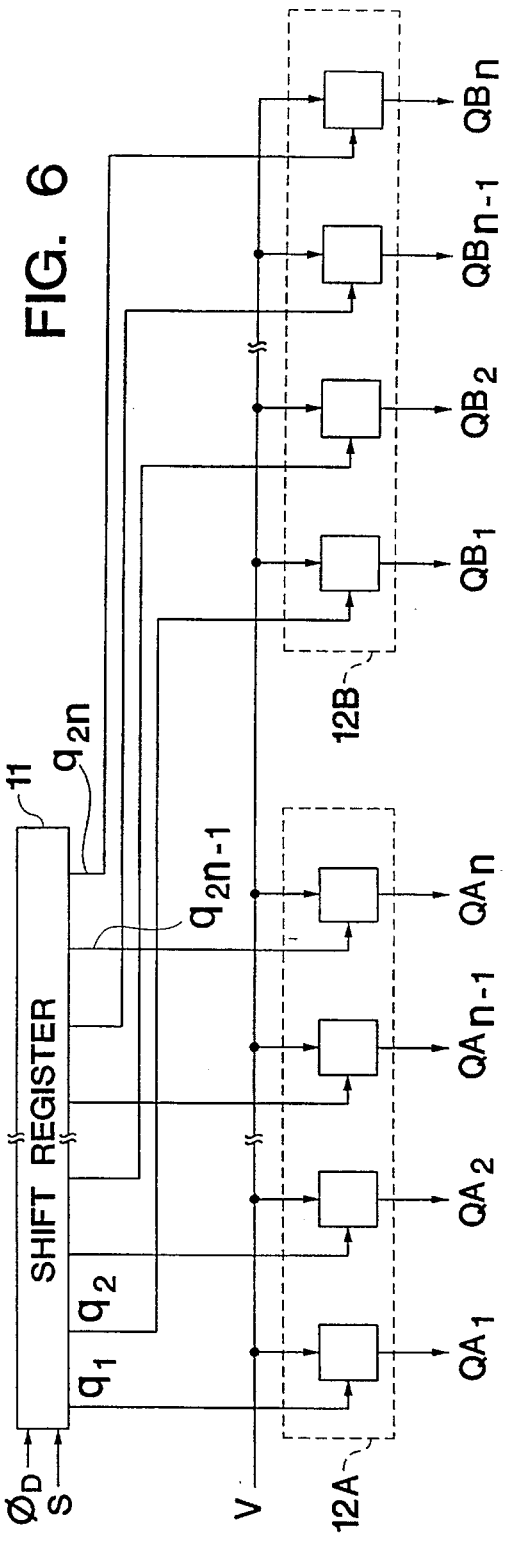

FIG. 6 shows the principal parts of a fourth embodiment of the invention. In this embodiment, the sample-hold circuits 12A and 12B sample the same input video signal V. According to this embodiment, the sampling timings of the two sample-hold circuits 12A and 12B differ by one-half of the sampling period, and therefore the number of the sampling points for the video signal V is twice as compared that in the column electrode driving circuit 116 (FIG. 12). The writing is performed at double speed in this way for two rows of pixels in a liquid crystal panel with a delta arrangement, based on the sampled video signal, resulting in that resolution is improved and slanted lines are displayed linearly. As described above, according to this embodiment, it is advantageous to sample the same video signal V, while there is no advantage for the two sample-hold circuits 122A and 122B to sample the same video signal in the column electrode driving circuit 116 (FIG. 12).

Figure 7:
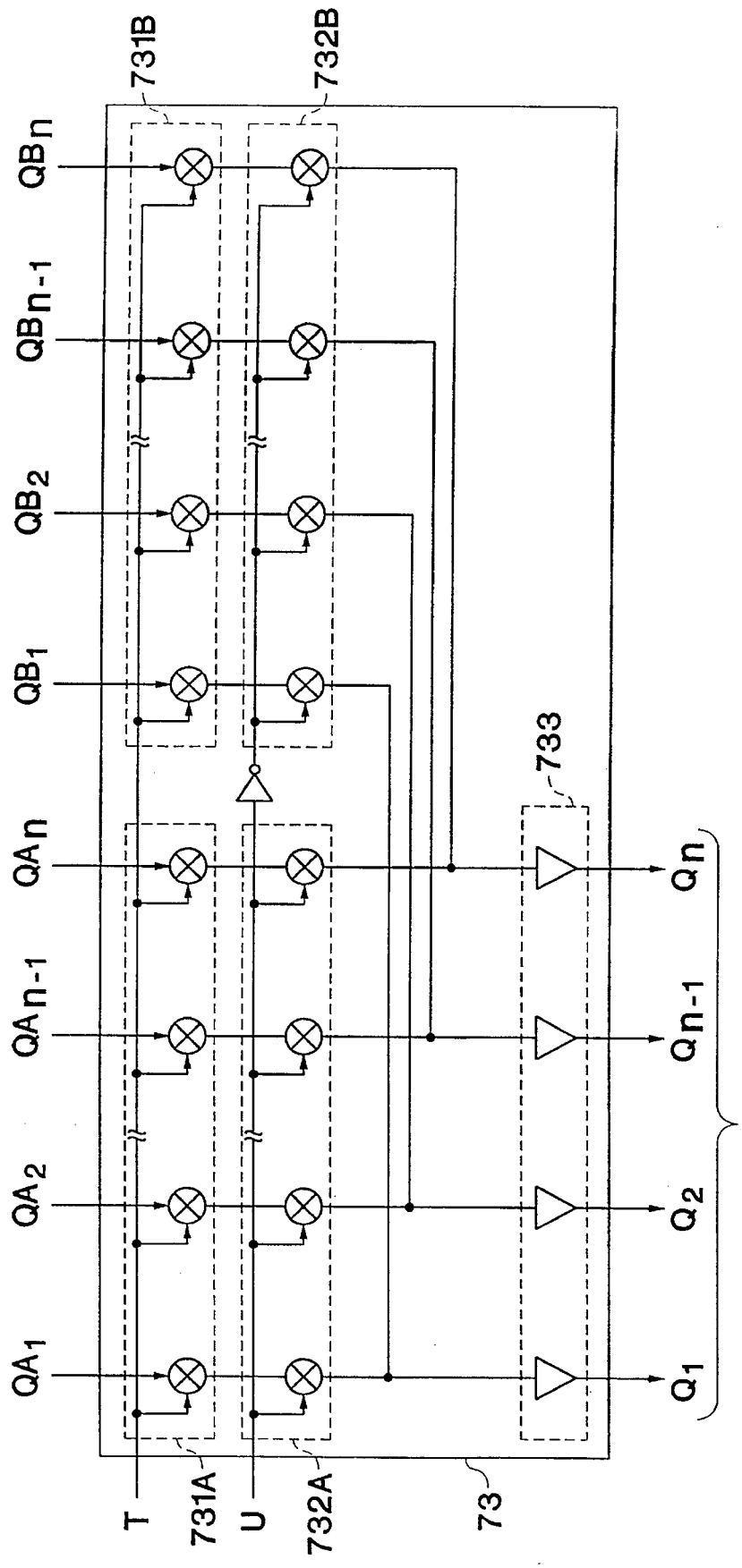

FIG. 7 shows the principal parts of a fifth embodiment of the invention. The fifth embodiment is provided with an output buffer circuit 73 which comprises holding sections 731A and 731B, selection sections 732A and 732B and a common buffer section 733 for the signals from the sample-hold circuits 12A and 12B. In accordance with the output pulse T, the holding section 731A holds the voltage signals $QA_1$ to $QA_n$ transmitted from the sample-hold circuit 12A, and the holding section 731B holds the voltage signals $QB_1$ to $QB_n$ transmitted from the sample-hold circuit 12B. The selection section 732A transmits the signals held by the holding section 731A to the buffer section 733 when the selection signal U is positive. The selection section 732B transmits the signals held by the holding section 731B to the buffer section 733 when the selection signal U is negative.

Figure 8:
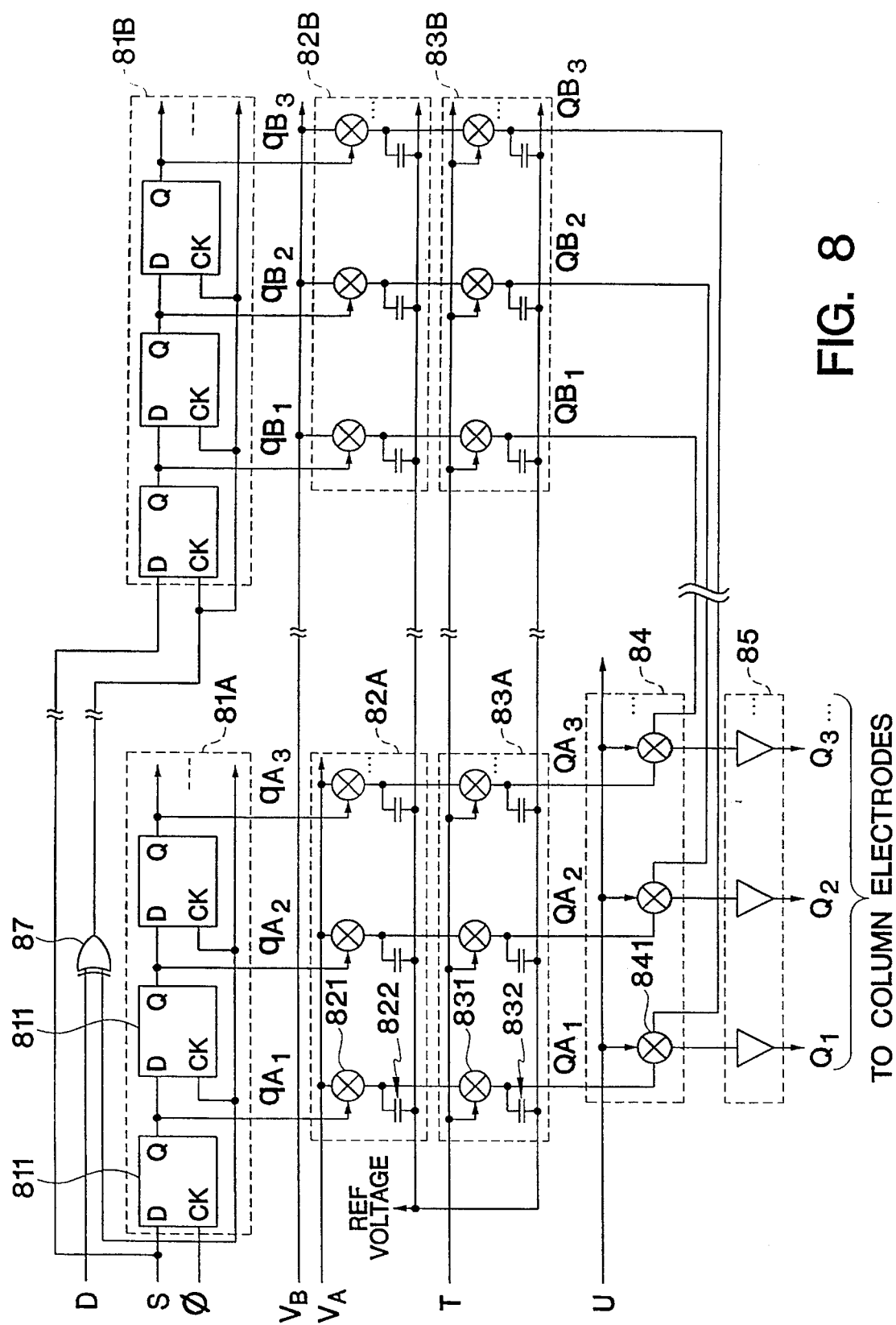
FIG. 8 is a circuit diagram illustrating a sixth embodiment of the invention.

A sixth embodiment of the invention is shown in FIG. 8. This embodiment has two shift registers 81A and 81B each of which comprises D-type flip-flops 811 connected in series. The sampling signal S is supplied to the D input of the first D-type flip-flops 811 of the shift registers 81A and 81B. A clock signal $\phi$ with a duty ratio of 50% is supplied to the CK input of the D-type flip-flops of the shift register 81A. The output of an XOR gate 87 to which the clock signal $\phi$ and a function selection signal D are input is supplied to the CK input of the D-type flip-flops of the other shift register 81B. When the function selection signal D is LOW, the same clock signal is supplied to both the shift registers 81A and 81B, so that this embodiment functions in the same manner as the column electrode driving circuit 116 (FIG. 12). When the function selection signal D is HIGH, the output of the XOR gate 87 inverts the clock signal φ, so that the timing of the output of the sampling signals $qB_1$, ... from the shift register 81B is shifted by one-half of the clock period ts (i.e., ts2) which is equal to the sampling period, from the timing of the output of the sampling signals $qA_1$, ... of the shift register 81A, thus causing this embodiment to operate in the same manner as the first embodiment.

Figure 10:
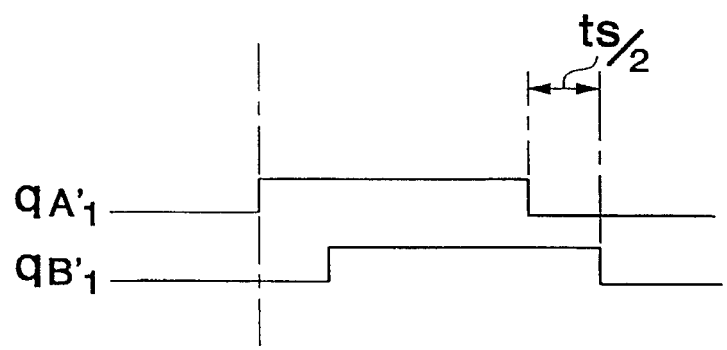
FIG. 10 is a timing chart illustrating the other possible operation of the embodiment of FIG. 8.
Figure 11:
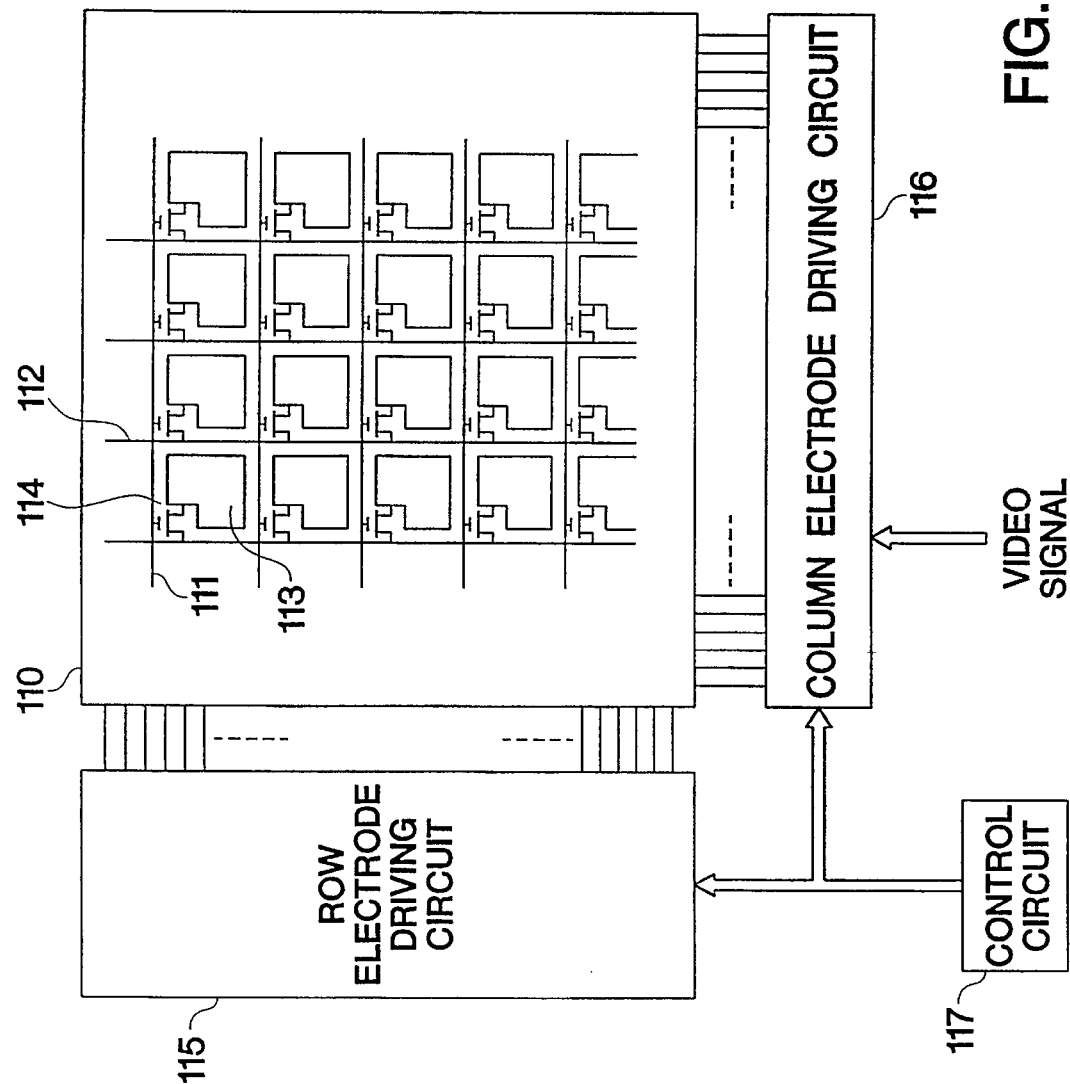
FIG. 11 diagrammatically illustrates a conventional LCD apparatus.

Like the signals $qA_1'$ and $qB_1'$ shown in FIG. 10, the sampling signals output from the shift registers 81A and 81B may have a pulse width longer than the sampling period ts, so that the sampling timing of sample-hold circuits 82A and 82B (which will be described below) can be shifted on-half of the sampling period (i.e., ts/2).

Figure 9:
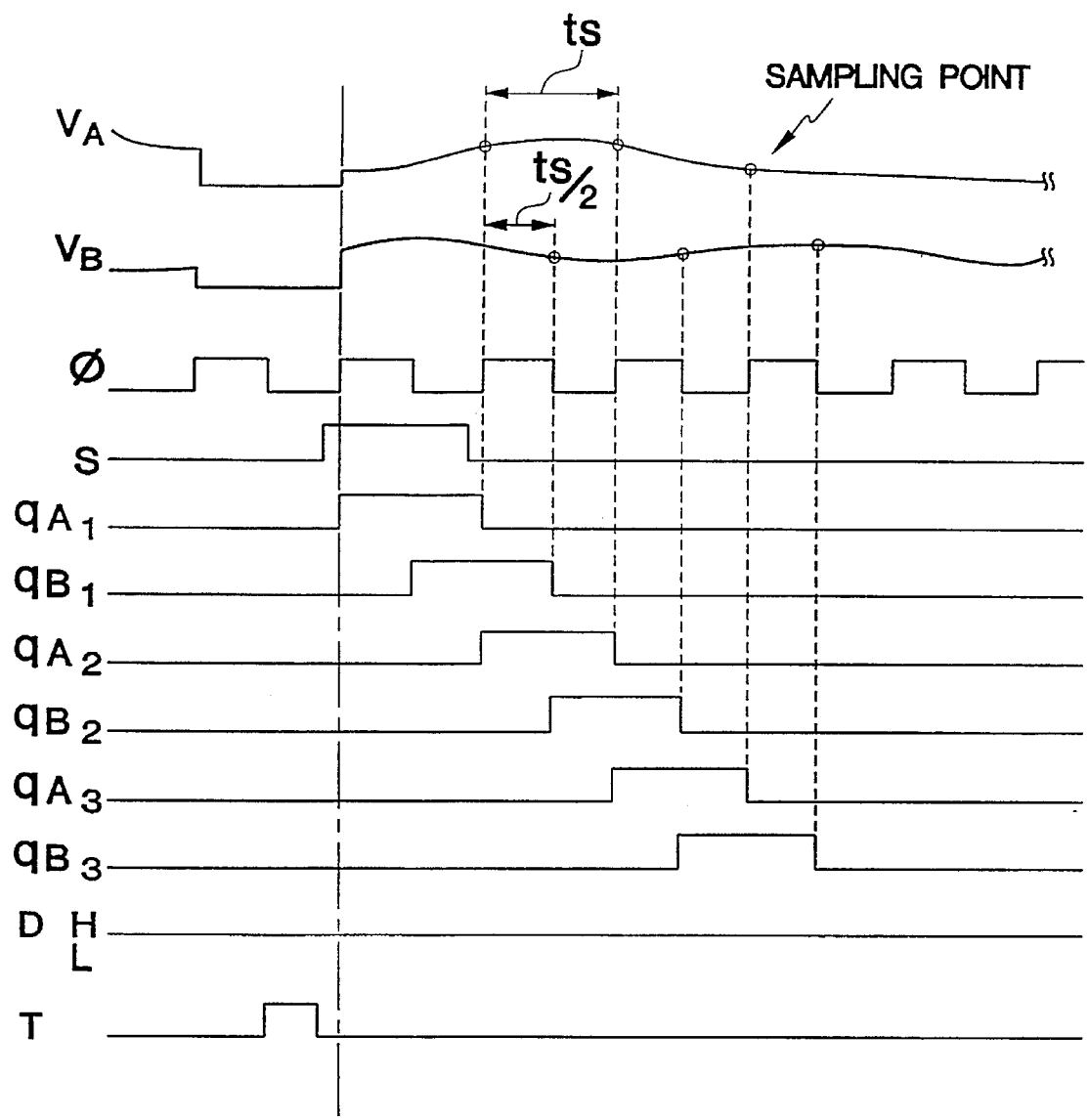
FIG. 9 is a timing chart illustrating the operation of the embodiment of FIG. 8.

The sample-hold circuit 82A comprises analog switches 821 and sampling capacitors 822. The analog switches 821 close according to the corresponding sampling signal from the shift register 81A, thereby supplying the input video signal $V_A$ to the sampling capacitor 822. If the time required to charge the sampling capacitor 822 is sufficiently shorter than the sampling period ts, then the voltage of the video signal $V_A$ at the fall edge of each of the sampling signals $qA_1$, ... is held in the corresponding sampling capacitor 822. The sample-hold circuit 82B has the same configuration as the sample-hold circuit 82A, but it samples and holds the video signal $V_B$ according to the sampling signals $qB_1$, ... output from the shift register 81B. The sampling points of the video signals $V_A$ and $V_B$ are shown in FIG. 9.

The outputs of the sample-hold circuits 82A and 82B are input to holding circuits 83A and 83B, respectively. The holding circuit 83A comprises analog switches 831 and holding capacitors 832. The analog switches 831 close in accordance with the output pulse T, so that the voltages held in the sampling capacitors 822 of the sample-hold circuit 82A are simultaneously transmitted to the holding capacitors 832. This transmission of voltages from the sampling capacitors 822 to the holding capacitors 832 is performed during the period in which the sample-hold circuit 82A is inhibited from sampling (e.g., the horizontal blanking period in a television signal). The holding circuit 83B has the same configuration as the holding circuit 83A, and the voltages held by the sample-hold circuit 82B are transmitted to the holding circuit 83B according to the output pulse T.

The outputs $QA_1$, ... and $QB_1$, ... of the holding circuits 83A and 83B are supplied to an output selection circuit 84. The output selection circuit 84 has analog switches 841 which selectively output either the outputs of the holding circuit 83A or those of the holding circuit 83B according to the selection signal U. The outputs from the output selection circuit 84 are transmitted to the column electrodes 112 of the liquid crystal panel 140 via the buffer circuit 85.

In the above, only embodiments applicable to display units with a delta arrangement have been described, but the invention is not limited to these embodiments. The invention are generally directed to column electrode driving circuits having a plurality of sample-hold circuits in which the sampling timings of the sample-hold circuits differ from each other.

According to the invention, the column electrode driving circuit can drive a display apparatus which has a delta arrangement display unit, with an excellent image quality.

In the column electrode driving circuits of the invention which is particularly suitable for driving a display unit with a delta arrangement, the video signals for two rows in the display unit can be processed simultaneously by two sample-hold means with sampling timings which differ mutually by one-half of the sampling period. Therefore, a high quality display which is equivalent to a double-speed conversion display can be performed without providing external double-speed conversion means or a line memory or frame memory for a video signal.

Furthermore, when the same video signal is supplied to two sample-hold means in a column electrode driving circuit of the invention that specifically conforms to display units with a delta arrangement, sampling is performed by the two sample-hold means according to timing that matches the delta arrangement. Since video signals sampled in this manner can be used to sequentially drive the display unit in half of the time of the sampling period, the advantages of the delta arrangement can be used to achieve high display quality without using an external memory or double-speed conversion circuit for the video signal.

It is understood that various other modification will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A column electrode driving circuit for driving column electrodes of a display apparatus having pixel electrodes formed in a delta arrangement driven by said column electrodes, comprising:

a plurality of sample and hold means, each for receiving a video signal, for sampling said video signal, and for holding said sampled video signal, the sampling periods of each said sample and hold means being substantially the same, and the sampling timings of each said sample and hold means being different; and output means for selecting a first one of said sample and hold means, and for driving said column electrodes on the basis of the sampled video signal held in said first selected sample and hold means to drive a first row of said pixel electrodes, and for selecting a second one of said sample and hold means, and for driving said column electrodes on the basis of the sampled video signal held in said second selected sample and hold means to drive a second row of said pixel electrodes, the output means being controlled by a selection signal, the first selected sample and hold means being used to drive one of two adjacent pixel rows and the second selected sample and hold means being used to drive the other of said two adjacent pixel rows, the sampling period of the first of said sample and hold means being overlapped with the sampling period of the second of said sample and hold means.

2. A column electrode driving circuit according to claim 1, wherein the number of said sample and hold means is two.

3. A column electrode driving circuit according to claim 2, wherein said driving circuit further comprises sample signal generating means and said sample signal generating means includes two shift registers, wherein timings of the two shift registers are different by one-half of a clock signal through exclusive-OR gates, and the sampling timings of said two sample and hold means are different by one-half of said sampling period corresponding to a half pixel pitch.

4. A column electrode driving circuit according to claim 2, wherein said driving circuit further comprises two sample signal generating means for sequentially generating sample signals corresponding to said two sample and hold means, the number of said sample signals being twice the number of said column electrodes, and said sample signals generated by said sample signal generating means being input directly to said sample and hold means so as to control sampling timings of said two sample and hold means, respectively, wherein timings of said sample signals are controlled based on two clock signals input to said two sample signal generating means, respectively, said two clock signals having a phase difference corresponding to one-half of said sampling period.

5. A column electrode driving circuit according to claim 4, wherein one of said two sample and hold means receives the odd ones of said sample signals, and the other of said two sample and hold means receives the even ones of said sample signals, said two sample and hold means performing the sampling in accordance with said received sample signals, respectively.

6. A column electrode driving circuit according to claim 2, wherein said driving circuit further comprises first and second sample signal generating means for sequentially generating sample signals, the number of said sample signals being equal to the number of said column electrodes, each one of said two sample and hold means receiving one of a first and second video signal, sampling each respective video signal, and holding each respective video signal, the sampling timings of each said sample and hold means being different by one-half of said sampling period.

7. A column electrode driving circuit according to claim 6, wherein one of said two sample and hold means receives sample signals from said first sample signal generating means, and the other of said two sample and hold means receives sample signals from said second sample signal generating means.

8. A column electrode driving circuit according to claim 5, wherein said driving circuit further comprises selection means coupled to the output of said sample signal generating means, and for selectively outputting either of said odd and even ones of said sample signals.

9. A column electrode driving circuit according to claim 1, further comprising:
sample signal generating means for outputting sampling signals to each said sample and hold means; and
wherein said sample signal generating means comprises a single shift register having a plurality of stages, the number of said stages being at least twice the number of column electrodes.

10. A column electrode driving circuit according to claim 1, wherein said output means comprises output buffer means for receiving said sampled video signals from each said sample and hold means, and for connecting said sampled video signals from each said respective sample and hold means to said column electrodes.

11. A column electrode driving circuit according to claim 1, wherein said output means includes switching means, a number of which is equal to a number of said plurality of sample and hold means.

12. A column electrode driving circuit for driving column electrodes of a display apparatus having pixel electrodes formed in a delta arrangement driven by said column electrodes, comprising:
a pair of sample and hold means, each for respectively receiving one of a pair of video signal, for sampling each respective said video signal, and for holding each said respective sampled video signal, the sampling periods of each said sample and hold means being substantially the same, and the sampling timings of each said sample and hold means being different by one half of a sampling period, the sampling period of one of said sample and hold means being overlapped with the sampling period of the other sample and hold means;
output means for selecting a first one of said sample and hold means, and for driving said column electrodes on the basis of the sampled video signal held in said first selected sample and hold means by a first voltage level of a selection signal to drive a first row of said pixel electrodes; and
said output means further comprising means for selecting a second one of said sample and hold means by another voltage level of said selection signal, and for driving said column electrodes on the basis of the sampled video signal held in said second selected sample and hold means to drive a second row of said pixel electrodes, wherein said means for selecting includes an inverter.

13. A column electrode driving circuit according to claim 12, wherein said output means comprises output buffer means for receiving said sampled video signals from each said sample and hold means, for connecting said sampled video signals from each said respective sample and hold means and for transferring each sampled video signal held in said first and second selected sample and hold means depending upon the level of said selection signal to said column electrodes.

* * * * *